United States Patent [19]

Yang et al.

[11] E Patent Number: Re. 32,485

[45] Reissued Date of Patent: Aug. 25, 1987

[54] WIDE-BEAM HORN FEED FOR PARABOLIC ANTENNAS

[75] Inventors: Richard F. H. Yang, Orland Park, Ill.; Laurence H. Hansen, Roswell, N. Mex.

[73] Assignee: Andrew Corporation, Orland Park, Ill.

[21] Appl. No.: 401,643

[22] Filed: Jul. 26, 1982

Related U.S. Patent Documents

Reissue of:

[64] Patent No.: 3,553,707
Issued: Jan. 5, 1971
Appl. No.: 641,348
Filed: May 25, 1967

[51] Int. Cl.[4] ..... H01Q 13/02
[52] U.S. Cl. ..... 343/786
[58] Field of Search ..... 343/781, 786, 840

[56] References Cited

U.S. PATENT DOCUMENTS

| | | | |
|---|---|---|---|
| 2,414,376 | 1/1947 | Heim | 343/772 |
| 2,460,869 | 2/1949 | Braden | 343/840 |
| 2,643,338 | 6/1953 | Brady | 343/914 |
| 2,742,640 | 4/1956 | Cronin | 343/772 |
| 2,881,432 | 4/1959 | Hatkin | 343/762 |
| 3,209,360 | 9/1965 | Schuster | 343/781 |
| 3,212,096 | 10/1965 | Schuster et al. | 343/786 |
| 3,216,017 | 11/1965 | Moore | 343/756 |
| 3,216,018 | 11/1965 | Kay | 343/781 |
| 3,274,603 | 1/1966 | Kay | 343/781 |
| 3,434,146 | 3/1969 | Petrich | 343/772 |

FOREIGN PATENT DOCUMENTS

| | | | |
|---|---|---|---|
| 660553 | 4/1963 | Canada | 343/786 |
| 729766 | 7/1966 | Canada | 250/33.65 |
| 759564 | 4/1967 | Canada | 250/33.63 |
| 5750 | 2/1952 | Fed. Rep. of Germany . | |
| 1393535 | 2/1965 | France . | |
| 378961 | 8/1964 | Switzerland | 343/767 |

OTHER PUBLICATIONS

Geyer; Circular Horn Radiator with Annular Wave Traps, Frequenz, BD 20/1966 NR.I, pp. 22–28.

LaGrone and Roberts, "Minor Lobe Suppression in a Rectangular Horn Antenna Through the Utilization of a High Impedance Choke Flange," *IEEE Transactions on Antennas and Propagation,* vol. AP-14, No. 1, pp. 102–104 (Jan. 1964).

L. Thorel, *The Antenna,* pp. 250–252.

*Primary Examiner*—Eli Lieberman
*Attorney, Agent, or Firm*—Leydig, Voit, Osann, Mayer & Holt, Ltd.

[57] ABSTRACT

Current-flow is suppressed on the outer surface of the horn except in a small endmost region. A reflector surrounds the horn, spaced rearwardly from the mouth. A choke used for the suppression blocks current-flow between the horn and the reflector. A high degree of uniformity of the radiation pattern over a wide forward angle is achieved.

12 Claims, 8 Drawing Figures

FIG. 1
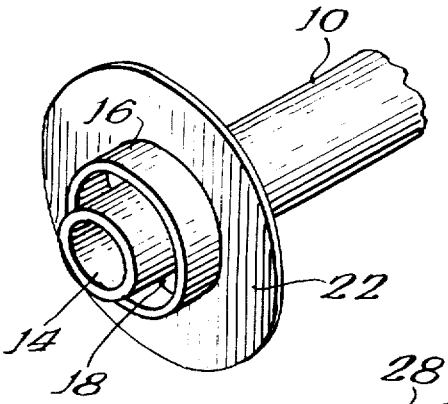
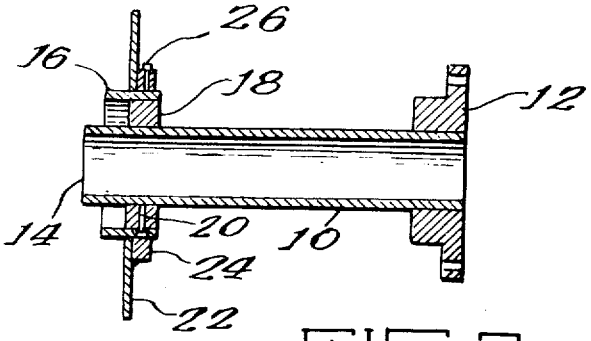
FIG. 2
FIG. 3
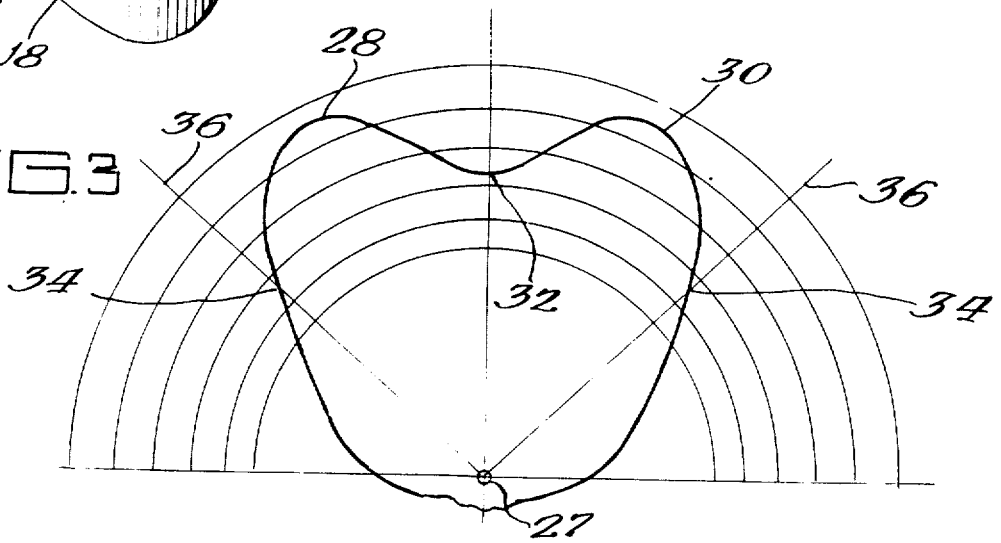
FIG. 4
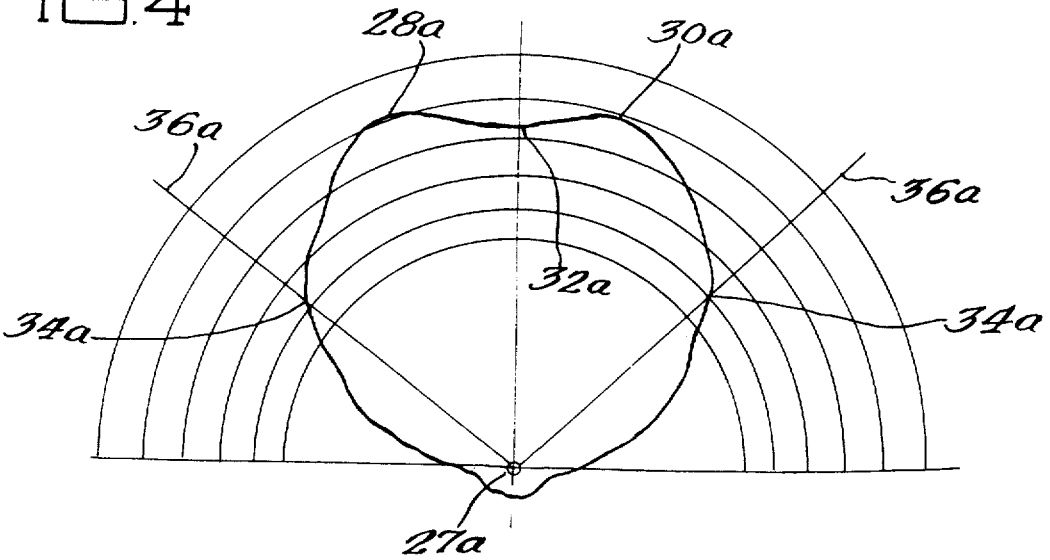

WIDE-BEAM HORN FEED FOR PARABOLIC ANTENNAS

Matter enclosed in heavy brackets [ ] appears in the original patent but forms no part of this reissue specification; matter printed in italics indicates the additions made by reissue.

This invention relates to horn feeds for parabolic antennas and like uses, and more particularly to feeds for high-efficiency uniform illumination.

As is well known, an ideal feed for a parabolic reflector would have a radiation pattern providing completely uniform illumination over the solid angle subtended by the reflector, with no radiation outside this solid angle. (Terms herein used such as "feed," "illumination," etc., although having an apparent implication of use in transmission, will be understood to refer equally to the reciprocal function of reception, as is conventional in the art.) Such an ideal pattern would be required for 100% gain efficiency. Feed patterns practically achievable fall considerably short of this ideal, particularly in the case of feeds for large-aperture reflectors employed in high-gain directional antennas.

The most satisfactory feeds for such purposes employ horn radiators. (The term "horn," as is well known to those in the art, has no necessary implication as to the shape of the end of the radiating conduit, usage of this term in the art having long since departed from the shape implication of this term as originally derived from other arts.) Horns may be designed with numerous patterns, both broad-beam and narrow-beam, and much effort has been devoted in the prior art to horn designs and appurtenances for concentrating the energy transmission and reception pattern in beams of varying angular width. Early efforts were primarily for the purpose of mere increase of directional gain, i.e., minimizing of the angle of energy dispersion. In more recent years, however, with the development of large-aperture reflectors, much work has been done on attempting to optimize radiation patterns at large angular beamwidths. The objective, of course, is to maximize the uniformity over the desired illumination angle while maintaining a minimum of spillover, i.e., radiation, backward or otherwise, not subtended by the reflector.

Much theoretical and experimental work has been done in the prior art on the radiation patterns of horns. The phenomena which occur at the open end are complex, involving many interactions of the conductive surfaces of the horn with the adjacent electric and magnetic fields. Although the theory is sufficiently well known to permit qualitative prediction of the effects of parameters of horn construction on the radiation pattern, fully exact calculation of radiation patterns actually obtained experimentally is difficult virtually to the point of impossibility, and measured radiation patterns normally contain lobes and irregularities not calculable from theory, particularly in the portions of the pattern substantially displaced from the central forward region, in which region the effects of the interactions of the wave front with the discontinuity at the end of the horn are minimum.

It is known that a substantial contribution to the spillover which is observed with simple horn constructions is due in considerable part to currents induced in the outer surface of the mouth of the horn, and resulting re-radiation thereby. It has heretofore been proposed to eliminate this re-radiation by surrounding the extreme end of a horn with a conducting plane serving as a ground plane. Such a construction produces substantial reduction of the back radiation and may also be made to somewhat reduce the slope or fall-off rate at the center portion of the forward beam as shown, for example, in U.S. Pat. 3,212,096, and has been used to increase the useful beamwidth in the so-called "scalar" feed.

The term "beamwidth" of course defines a region of the feed pattern which can be assigned a specific angular value only in terms of specified maximum ratios of field intensity. The 3 db beamwidth, for example, is of course smaller than the 10 db beamwidth, the angular difference being more or less indicative of the rate of fall-off of intensity outside the 3 db beam.

The present invention flows from a finding that the full shielding of the external surfaces of the horn in the manner heretofore practiced to reduce back radiation eliminates a component which is useful in broadening the useful beamwidth (i.e., the included angle of the pattern which is "flat" to any particular ratio) and that the central portion of a horn pattern can be greatly flattened by suppressing radiation from, and current-flow in, only the portion of the outer surface rearward of a region at the end, radiation from this region making a substantial addition to the regions of the central portion of the pattern at which the fall-off is otherwise the limiting factor of useful beamwidth. Preferably, the suppression of current flow in the outer surface of the horn rearward of the front zone left active in the pattern-formation is accomplished by a tubular conductor surrounding the outer surface of the horn and shorted thereto to form a quarter-wave coaxial choke confining currents of the frequency of operation to the front zone of the horn thus defined. This zone preferably extends about one-quarter wavelength back from the extreme end of the horn, but in any event should be from one-eighth wavelength to one-half wavelength and in no case greater than a wavelength.

As a related aspect of the invention, it is found that the useful beamwidth is even more greatly increased with the addition of a reflector surrounding the horn but withdrawn from the end, preferably at a distance of from approximately one-quarter wavelength to approximately three-quarters wavelength, and desirably about one-half wavelength for most uses, isolated from the external surface of the horn for direct conductive current flow therebetween at the operating frequency by high-frequency insulating means, such as the coaxial choke just mentioned. The reflector so disposed, desirably of transverse dimensions of approximately one to five wavelengths, is in the path of radiation from the end of the horn, including radiation diffracted by the choke where these aspects of the invention are combined. It serves not only to reduce the back radiation, but also to enhance the illumination in the region of otherwise greatest fall-off to such an extent that the pattern can not only be made substantially flat over an appreciable angle, but indeed can, if so desired, produce in these regions broad lobes of controllably higher intensity than the center of the beam, thus making possible extremely broad beamwidths for any specified permitted ratio of variance.

The invention may be employed with a variety of the basic radiating horn forms which are known, and indeed with certain of the modified horn forms already specially devised for widening the beamwidth, such as those employing particular structures for this purpose within the end of the horn. From an economic standpoint, however, the invention has greatest advantage with the simplest and most easily fabricated types of horn, such as mere open-ended waveguide, with or without a radiation-transparent window.

The generalized or qualitative statements above of the theory underlying the novel constructions of the invention, although believed to be approximately accurate, will be understood to be not necessarily fully descriptive of all of the detailed electromagnetic phenomena which contribute to the results which are obtaned. The exact selection of optimum construction features and dimensions for utilizing the invention with any given horn, and for the production of any particular pattern, are necessarily a matter of simple experiment, such as is required in the design of any high-frequency components of this general class. The teachings of the invention, and the advantages achieved thereby, will be more fully understood, both as regards the general aspects already described and otherwise, by consideration of the particular embodiments illustrated in the drawings and described below.

In the drawings:

FIG. 1 is a view in orthogonal perspective of a wide-beam feed embodying the invention;

FIG. 2 is a view in longitudinal section of the feed of FIG. 1;

FIG. 3 is a radiation pattern, in polar coordinate representation, of the feed of FIGS. 1 and 2 at a typical frequency within its operating band, taken in the E plane;

FIG. 4 is a pattern similar to that of FIG. 3 but taken in the H plane;

Figure 5:
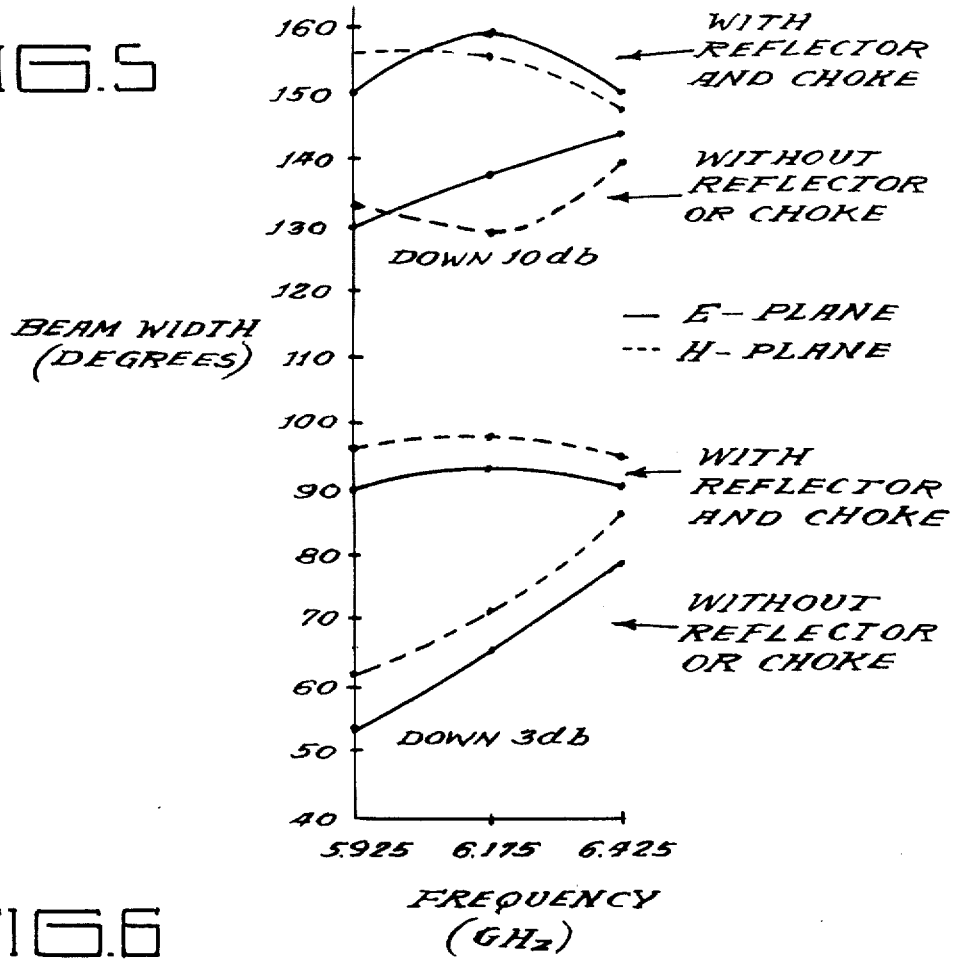
FIG. 5 is a graph or chart showing the beamwidth characteristics as a function of frequency of the feed of FIGS. 1 and 2, and of the basic form of horn therein employed, i.e., with and without the improved construction of the invention.

Referring first to FIGS. 1 and 2, the invention is shown as applied to the structurally simplest form of radiating horn, an open-ended circular waveguide tube 10, provided with a flange coupling 12. It will be understood that the form of coupling to the horn is irrelevant to the invention, the flange 12, for connection to a feed guide or transition section, being only one of many known types of horn couplings.

Backwardly offset from the mouth 14 is a sleeve 16 of larger diameter than the horn, mounted on a support ring 18 fitted over the outer surface of the horn, and secured in longitudinal position by radial screws 20 engaging the horn. An annular reflector plate 22 surrounds the outer surface of tube 16, being affixed to a second support ring 24 locked in longitudinal position by screws 26.

The annular region between the sleeve 16 and the horn 10 extends back a quarter-wavelength at the frequency of operation, thus forming a coaxial shorted quarter-wave choke, isolating the protruding front end of the outer surface of the horn from the balance thereof as regards current flow and re-radiation at the operating frequency.

The feed of FIGS. 1 and 2 was constructed and tested for performance in the frequency band between 5.925 and 6.425 gHz. (5,925 to 6,425 megacycles), patterns being taken at these frequencies and at the 6.175 gHz. center frequency.

In this construction, there was employed an open-ended circular waveguide tube 10 of 1⅜ inch diameter, a sleeve 16 of 2 inch diameter forming a choke annulus 3/16 inch wide, and the plate 22 was 5 inches in diameter. The mid-band wavelength is 1.91 inches. The choke sleeve 16 was withdrawn very slightly over a quarter wavelength from the end 14, and the reflector plate 22 was in turn withdrawn the same distance from the front end of the choke sleeve.

FIGS. 3 and 4 show typical patterns obtained in the E and H planes, respectively. These patterns are shown in polar coordinates with a logarithmic $\tau$ scale of 1 db per marked division, only the outermost being shown in the drawing. As shown in FIG. 3, the maximum or reference points were at 28 and 30, substantially angularly displaced from the usual central location, which was, as seen at 32, approximately −2 db. The beamwidth angle defined by radial lines 36 drawn through the −3 db points 34 is greater than 90 degrees.

In FIG. 4, there is shown the H-plane pattern, with reference characters the same as those used in FIG. 3, with the addition of the letter $\alpha$. Here the 3 db beamwidth angle is still wider, and the central portion is flatter, there being a region of approximately 60 degrees with less than ½ db variation.

The particular patterns illustrated were taken at the lower end of the frequency band but are fully typical of those obtained throughout the band, variations being minor. It is believed that the signal enhancement in the desired region is optimized by the approximate radial alignment of the end of the horn, the end of the choke and the edge of the reflector, this arrangement tending to create a substantial component of radiation refracted at the edge of the choke and thus incident on the reflector at relatively small angles.

FIG. 5 shows comparative data, taken in another series of experiments, of angular beamwidth as a function of frequency. As therein shown, not only were both the 3 db and 10 db beamwidth angles greatly widened by the addition of the structure of the invention, but the frequency-dependence was greatly reduced in each case. Further, the ratio of the 3 db beamwidth to the 10 db beamwidth was substantially higher with the construction of the invention.

Results obtained with the choke construction alone, i.e. with the reflector plate removed, showed (not illustrated) substantial pattern improvement over the plain open-ended tube, although the beamwidth angles obtained were substantialy less than with the reflector present, and the central concavity of the patterns illustrated in FIGS. 3 and 4 did not appear.

Figure 6:
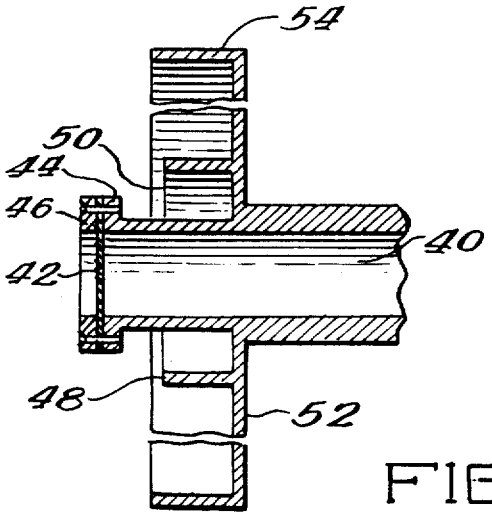
FIG. 6 is a sectional view of a modified form of the feed of FIGS. 1 and 2.

A variant form of construction is shown in FIG. 6. Here the guide 40 terminates in a radiation-transparent window 42, the edges of which are clamped between a flange 44 and a clamping ring 46. Neither the addition of the window nor the transverse dimensional change thus produced on the outside surface of the end is found to have any substantial effect on the basic operation of the invention, although optimum design parameters within the ranges earlier stated may be slightly altered. As previously, a choke sleeve 48 forms a quarter-wave annular cavity at 50. The sleeve 48 and the shorting member are shown in the drawing as integral with the reflector plate 52, but it will be understood that this and following figures of the drawing omit assembly details which are of no relevance to the invention.

Around the edge of the reflector plate 52, there is added a forwardly extending shield or skirt 54. It will be noted in FIGS. 3 and 4 that there is a slight residual back radiation at 38 and 38a. This portion of these patterns does not demonstrate lobes or other irregularities, having a substantially uniform value somewhat more than 20 db down in the backward direction in both planes, although of somewhat greater amplitude than this at sideward angles, particularly in the E plane. Back and side radiation of these magnitudes is fully acceptable for most purposes, but may be reduced if so desired by addition of the shielding skirt 54. The dimensioning of the skirt is not highly critical, but interacts with the other construction parameters in reaching optimum conditions of both uniformity of reflector illumination and minimizing of spillover.

Figure 7:
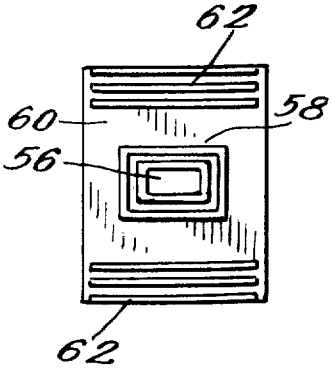
FIG. 7 is a view in front elevation illustrating the application of the invention to a rectangular waveguide feed.

FIG. 7 shows an embodiment of the invention employed with a rectangular waveguide horn 56. The choke sleeve 58 conforms in shape to that of the guide and the reflector 60 is here shown as square, although a round reflector plate may be used if so desired, correspondence to the shape of the horn mouth being of no substantial significance. In this embodiment, in place of the skirt 54 of FIG. 6, there are employed a series of vanes 62 at the edge of the plate, perpendicular to the electric field orientation of the fundamental mode in the rectangular guide. These vanes preferably extend parallel with each other from the reflector about a quarter-wavelength, thus defiining, in essence, a series of shorted chokes confining current flow and re-radiation to the portion of the plate bounded thereby (this non-radiating portion being excluded in determining the dimensions of the reflecting plate earlier described). Where more than one wave polarization is to be employed, as where the rectangular (usually square, in this case) horn is to be used with cross-polarized signals, such a structure should of course extend along all margins in most uses.

Figure 8:
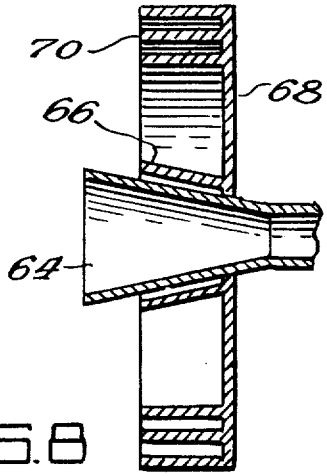
FIG. 8 is a sectional view showing a further modified form of the invention.

In general, the patterns produced by flared horns are well-known to be normally narrower than in the case of omission of flare. However, there are certain instances where flaring is desired for purposes such as impedance-matching. Further, the pattern alteration, particularly as regards flattening the central portion of the forward characteristic, provided by the present invention, is not limited in its advantages to mere open-ended waveguide horns. In FIG. 8, there is accordingly illustrated a typical manner in which the present invention may be used with a flared horn 64. As here illustrated, the choke sleeve 66 is similarly flared to make the choke of uniform annular width. Such a construction is generally desirable, but should not be considered completely essential, a choke of irregular internal shape being generally sufficient to attenuate current flow and radiation sufficiently for the present purpose. The embodiment shown in FIG. 8 uses a reflector plate 68 and choke vanes 70 generally similar to those previously described.

Persons skilled in the art will readily utilize the invention in embodiments differing substantially in appearance and details of operation from those illustrated and described above. As one example, all of the illustrated embodiments employ a planar reflector having no longitudinal shape component. Such a construction is in general desirable, but a slightly coned or curved configuration may be employed for pattern shapes required for particular uses. Similarly, the suppression of high-frequency currents on the outer surface of the horn may be accomplished by means other than the preferable construction above described. Likewise, there may be devised other forms of current-isolation supports for the reflector.

The scope of the protection to be afforded the invention should accordingly not be limited to the embodiments illustrated and described, but should extend to all structures incorporating the teachings of the invention as defined in the appended claims, and equivalents thereof.

What is claimed is:

1. A wide-beam directive radiator for feeding parabolic reflectors and like uses comprising:

(a) an open-ended high-frequency conductive radiating horn, and coupling means therefor adapted for operation at a preselected frequency, (b) a forwardly facing conducting surface reflector having its central portion surrounding the horn at a distance of from approximately one-quarter wavelength to approximately three-quarters wavelength rearwardly of the end thereof, (c) and high-frequency insulating means between the external surface of the horn and the inner portion of the reflector for blocking high-frequency current flow therebetween at the operating frequency *said high-frequency insulating means being spaced rearwardly from the open end of said horn to permit radiation from a limited region of the outer surface of the forward end of said horn.*

2. The radiator of claim 1 wherein the high-frequency insulating means comprises a shorted quarter-wave choke.

3. The radiator of claim 2 wherein the choke comprises a tubular conductor surrounding the outer surface of the horn and conductively shorted thereto at the rearward end.

4. The radiator of claim [3] *1* wherein [the forward end of the tubular conductor is rearward of the end of the horn to permit radiation from the outer surface of only the forward end of the horn] *said high-frequency insulating means is spaced rearwardly from the open end of said horn by less than a wavelength.*

5. The radiator of claim [4] *3* wherein the forward end of of the tubular conductor, the forward end of the horn, and the peripheral portion of the reflector are in approximate radial alignment.

6. The radiator of claim 1 wherein the reflector is an uninterrupted plane surface.

7. The radiator of claim 1 wherein the reflector has conducting portions extending longitudinally forward at the periphery to block side radiation.

8. The radiator of claim 1 including a conducting member having its outer edge approximately radially aligned with, and between, the peripheral portion of the horn and the edge of the reflector.

9. In a primary radiator for feeding of large-aperture parabolic reflectors and like uses having an open-ended high-frequency conductive radiating horn and coupling means therefor adapted for operation at a preselected frequency, the improved construction for wide-beam radiation comprising a quarter-wave radiation choke for such frequency on the outside wall of the horn, spaced rearwardly from the open end thereof by a distance greater than about one-eighth wavelength but less than a wavelength, the portion of the horn wall between the choke and the open end being exposed for re-radiation, *and a conductive reflector extending transversely outward from said horn and spaced rearwardly from the open end thereof for reflecting forwardly a portion of the back radiation from the end of the horn, said reflector being isolated from the end of the horn by said choke.*

10. The improved primary radiator of claim 9 having a conductive reflector extending transversely outward at a distance of from approximately one-quarter wavelength to approximately three-quarters wavelength rearwardly of the end of the horn and isolated from the end of the horn by the choke with respect to conductive current flow at the operating frequency, the reflector reflecting forwardly a portion of the back radiation from the end of the horn.

11. The improved primary radiator of claim 10 wherein the reflector is of transverse dimensions of approximately 1 to 5 wavelengths.

12. The improved primary radiator of claim 10 wherein the choke is approximately a quarter-wavelength from the end of the horn and the reflector is a radially extending planar conductor approximately a half-wavelength from the end of the horn.

* * * * *